United States Patent

Bocionek et al.

(10) Patent No.: US 6,301,360 B1
(45) Date of Patent: *Oct. 9, 2001

(54) METHOD OF ENCODING INFORMATION USING A POSITION-BASED ENCODING SCHEME

(75) Inventors: Siegfried Bocionek, Erlangen; Ingolf Karls, Feldkirchen; Dieter Schütt; Wanda Latocha, both of München, all of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,062

(22) PCT Filed: May 30, 1996

(86) PCT No.: PCT/DE96/00951

§ 371 Date: Nov. 25, 1997

§ 102(e) Date: Nov. 25, 1997

(87) PCT Pub. No.: WO96/38946

PCT Pub. Date: Dec. 5, 1996

(30) Foreign Application Priority Data

Jun. 1, 1995 (DE) ............................................. 195 20 232

(51) Int. Cl.[7] ........................................................... H04L 9/28
(52) U.S. Cl. ................................. 380/28; 380/54; 713/176
(58) Field of Search ........................ 380/54, 28; 713/176

(56) References Cited

U.S. PATENT DOCUMENTS 2,405,500 * 8/1946 Guanella .................. 380/40
5,689,587 * 11/1997 Bender et al. .................... 380/54 X
5,905,819 * 5/1999 Daly ..................................... 382/284

OTHER PUBLICATIONS

Wayner, P. "Dissapearing Cryptography Being and Nothingness on the Net" (AP Professional, Boston 1996) pp. 168–171.*
Walton, S. "Image Authentication For a Slippery New Age" Dr. Dobbs Journal, (Apr. 1995) pp. 18–20, 22, 24, 26, 82, and 84–87.*
"MandelSteg V1.0 and GIFExtract V1.0" 4 pages downloaded from http://www.unicorn.com/pgp/m˜readme.html on Feb. 7, 2000.*
Sci.crypt Newsgroup "FAQ on Steganography" 8 pages posting date May 10, 1994.*
Bruce Schneier, "Applied Cryptography: Protocols, Algorithms, and Source Code in C", 2nd edition John Wiley and Sons, N.Y. (1995) pp. 197–206.*

(List continued on next page.)

Primary Examiner—Norman M. Wright
Assistant Examiner—James Seal
(74) Attorney, Agent, or Firm—Schiff Hardin & Waite (57) ABSTRACT

Data sequences comprised of figure-coded units, such as text comprised of ASCII characters, are encoded into another data entity, such as a pixel based image. The encoding implements a positionally-based encoding scheme in which values of the data entity (basic matrix) upon which the data sequences are to be encoded is used. The position for values to be changed in the basic matrix are determined by a reversible function, and the encoding value that these values are changed by may be 1, another arbitrary number, or determined by a formula. The counterpart to the reversible function is known by an intended receiver of the encoded data for decoding purposes. The basic matrix may be generated utilizing a suitably complex function, such as a chaos function, with parameters known only to the sender and receiver.

13 Claims, 5 Drawing Sheets

OTHER PUBLICATIONS

David E. Newton, "Encyclopedia of Cryptology", Instructional Horizons (1997) pp. 19, 43, and 223.*

David Kahn, "The Codebreakers" Scribner (1967) Chapter 4, pp. 125–156.*

Department of Electrical Engineering, Keio University, Japan, Editor D.W. Davies, A Secret Key Cryptosystem By Iterating a Chaotic Map, pp. 127–140.

* cited by examiner

METHOD OF ENCODING INFORMATION USING A POSITION-BASED ENCODING SCHEME

BACKGROUND OF THE INVENTION

1. Field of the Invention

The invention relates to a method by which figure-coded data units such as ASCII characters or any other data identifiable in an unambiguous manner can be encoded using changes in a value located at positions calculated with a reversible function within another data entity.

2. Description of the Related Art

Modern communication services and communication options, which may involve networked personal computers, home banking applications, and the Internet, require an increasingly high volume of communication, especially in the entertainment sector which heavily utilizes multimedia and video on demand. In this context, data security is becoming more and more important, as are associated encoding methods for encoding data to be transmitted, especially those methods which can be implemented in a simple manner and without a high computing complexity.

An important aspect of encoding technology is that an unintended receiver does not obtain access to the information that has been encoded. To accomplish this, the information is encoded in such a manner that another receiver which does not have knowledge of certain key parameters cannot decipher this information.

The authors Toshiki Habutso, Yoshifumi Nishio, Iwao Sase and Shinsako Mori describe a secret key cryptosystem using the iteration of a chaotic card. In this method, a key which is used for encoding information is determined by using a chaos function which is found in a chaos card. No other relevant prior art is known.

SUMMARY OF THE INVENTION

The object of the invention is to present an encoding method for figure-coded data units (that are numerical values) which is simple to carry out and offers high security. This method for encoding the data units utilizes a function which cannot be derived by using its function values as a basis.

In general terms the present invention is a method for encoding sequences consisting of figure-coded data units. The invention contains two general steps: 1) occupying a basic matrix with initial values, and 2) encoding figure coded data from the sequence to be encoded into the basic matrix. An at least two-dimensional basic matrix is occupied with values by at least one feedback function such that the value allocated to a respective cell of the matrix at at least one cell index, which specifies the position of the cell in the matrix, is determined by this feedback function.

For encoding the first (figure coded) data unit from the sequence, a value of the matrix cell is changed whose position within the matrix is calculated by applying a first reversible function to the code number (value) of the first data unit of the sequence to be encoded. For encoding the second data unit from the sequence, a value of the matrix cell is changed whose position within the matrix is calculated by applying a second reversible function, which may or may not be the same as the first reversible function applied to the first data unit, to the code number of both the first and second data units. This process may be continued for the remaining figure coded data units of the sequence.

Advantageous developments of the present invention are as follows.

For encoding the first figure coded data unit from the sequence to be encoded, starting from any arbitrary starting cell of the matrix, the cell indices (i.e., the location within the matrix) of a first encoding cell of the basic matrix are found by the first reversible function by combining the cell indices of the start cell in an unambiguous and reversible manner with the code number/value of the first data unit; the value of this first encoding cell is then changed. For encoding the second figure coded unit from the sequence, the value of a second encoding cell of the basic matrix (this basic matrix being now modified by the coding of the first value) is changed; the indices of the second encoding cell result from the application of the unambiguous reversible combination of the second reversible function and the first encoding cell.

For occupying the basic matrix, a chaos function may be used as a feedback function in which a first function value supplied by the function after repeated iterations of the feedback function may depend on the variation of the function after exceeding a predetermined limit value. If the limit value condition cannot be met, the function value which results after a predefined number of iterations may then be used for occupying the matrix with values.

For calculating the matrix indices of the first encoding cell, the code number of the first data unit is added to at least one arbitrary selection of the basic matrix indices.

For the encoding, the value of a respective encoding cell is changed by the number 1 as the encoding value.

The encoding value represents a numerical value by which a cell in the basic matrix, located at a matrix index determined above, may be changed. This value may be 1, for example, and can depend on the number of previously encoded data units: it may also be determined by using an encoding value chaos function (that is distinct from the chaos function that may be used to occupy the basic matrix).

The matrix with the values contained therein is used as a two-dimensional matrix for generating an image, the values stored in each matrix cell being used as color and/or gray-scale values. The encoding value is scaled with the number of absolutely possible color or gray-scale values.

For the purpose of authentication or identification, respectively, the matrix is applied to any image medium, and may be added to any image data record.

For decoding, the type of matrix is made known which is occupied with values, as in the case of the encoding, with knowledge of the first feedback function and how it is applied, resulting in an output matrix. The encoded sequence matrix is compared value by value with the output matrix in order to find any changed values. For decoding a first changed value, the inverse of the reversible function is applied to the matrix indices and thus the code number of the first data unit is found. An analogous procedure is adopted for a second changed value, in the reverse order as used during the encoding.

The method according to the invention especially advantageously specifies an encoding method in which an encoder and a decoder agree on a function, its parameters and starting values, on a transmission (basic) matrix, and on a manner in which the latter is to be occupied with values. It is only with the knowledge of these parameters that a decoding person can build up this basic matrix (unencoded) in order to be able to decipher encoded information by a comparison in this manner. In this method, certain cells of this basic matrix are advantageously changed in dependence on the figure-coded data units and thus only become decodable by a receiver with the knowledge of the basic matrix.

However, this basic matrix is not accessible to a third person since it is occupied with values via a multiple-feedback function such as, for example, a chaos function or another suitable complex function.

A simple solution to the problem addressed by the invention, which is therefore easily carried out, is available by using a two-dimensional or multidimensional matrix in which the matrix indices of the encoding cells are combined with the figure codes of the data units by means of a reversible function in an unambiguous manner. To establish the unambiguousness in applying the reversible function, the matrix cells to be encoded advantageously found by considering the preceding encoding cells.

To save computing complexity, it is advantageously provided to carry out the iteration with the feedback function only until a certain limit value is exceeded, where such a limitation occurs depending on the variation of the feedback function.

The method according to the invention may also advantageously be discontinued after a fixed number of iterations and the function value then available is used for encoding in order to avoid convergence problems and associated endless loops in the calculation of the function values.

In the method according to the invention, it is advantageously provided to combine the matrix indices with the function code number since an addition can be carried out, for example, by a simple shift operation in a register and thus quickly. In this method according to the invention, it is especially advantageous to change the value of a matrix cell which is used for the encoding only very slightly since this makes the decoding much more difficult for an unintended recipient.

In the method according to the invention, it is advantageously provided to make the encoding value of a matrix cell dependent on the number of data units already encoded previously since this provides further decoding difficulties for an unintended recipient of the data. The use of a chaos function for establishing the encoding value may also be used to provide further decoding difficulties.

The function to be encoded can be especially advantageously concealed in an image which has been generated by means of a chaos function, the matrix cells being established in a known manner in the two-dimensional matrix of the image and the encoding being carried out in the form of an increase or decrease in the gray-scale or color values, respectively.

Especially advantageously, the encoding value may be made dependent on the number of possible gray-scale values or color values, respectively, and to scale it with the maximum number of possible gray-scale values, which permits the information delta for the decoding to be made as small as possible (i.e., minimal changes in the data elements when encoding) and thus makes any decoding by unintended third-party accessors yet more difficult.

Especially advantageously, image matrices, image data records or images made in accordance with the method according to the invention can be protected since data to be encoded can be accommodated in a concealed manner at certain places in an image or in an image data record.

Advantageously, an information sequence which has been encoded according to the method according to the invention is decoded by a decoder which has previously been informed about the selected encoding parameters and the corresponding functions. Since these cannot be derived from the function values by an unintended third party recipient, and this third party should already have difficulties with the type of encoding, the method according to the invention is especially secure.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1A:
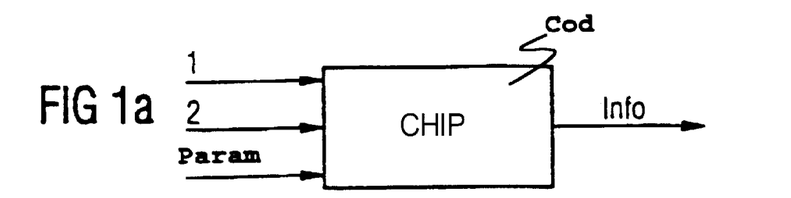
FIGS. 1A and 1B are block diagrams showing a simple example of encoding according to the method according to the invention.
Figure 1B:
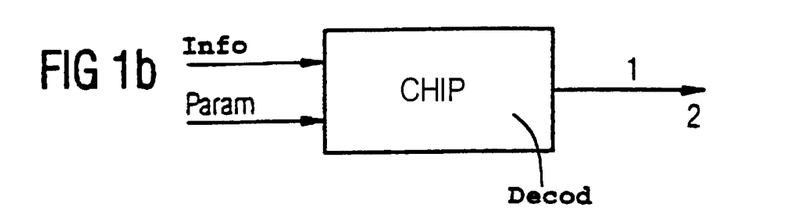

FIGS. 1A and 1B show a diagrammatic representation of the encoding and decoding of data units according to the method according to the invention. The encoding according to the method of the invention may be understood, for example, as information heterodyning/combining. The basic matrix information to be heterodyned consists of values which are generated in the basic matrix on the basis of a chaos function, a complex function, or another feedback function. The other information used in the heterodyning process is the actual information to be encoded (encoding sequence) which is composed of figure-coded data units, e.g., text in ASCII format. However, the method according to the invention can also be used for transmitting any other figure-coded information such as music in digital form.

FIG. 1A, for example, shows the heterodyning process in a chip Cod. The chip is supplied with two separate information items (encoding sequences) 1 and 2 and a parameter set for initialization and control of the complex, chaos or other feedback functions. Using the output parameters and the feedback function, the information heterodyning chip Cod generates a basic matrix which is two- or multidimensional so that, in the end, a basic matrix is obtained which is completely occupied by values which, for example, result from inserting the matrix indices into the function. For example, the chaos function can be executed several times until a certain limit value has been exceeded and the subsequent value can be entered into a matrix cell. Furthermore, if no limit value is exceeded when the function is applied several times, an exception handler can provide that the method carries out a certain number of the iterations and then occupies the matrix cell with the function value obtained after this number of iterations. This procedure and the application of such a function offers the great advantage that unauthorized data accessors have no possible means of generating the same value-occupied basic matrix if they do not know the initial parameters and the initialization values. It is thus of particular importance in the method according to the invention that both the transmitter and the receiver have agreed to an unambiguous established procedure. Agreement must, for example, be achieved on the function, on the initialization value of the function, and on the way in which the matrix values are changed so that during the decoding, the figure code of the data units can be recovered based on the change in the matrix value and the relationships between the individual occupied matrix encoding cells. It is thus of importance to establish the manner in which the figure codes are combined with the positions of the matrix cells in order to be able to recover the figure codes in a reverse manner from the different changed matrix cells during the decoding.

After, for example, the information items 1 and 2, which are changed in the heterodyning chip Cod with the aid of the parameters and the feedback function, have passed through the chip, a uniform information stream is obtained which contains the encoded information (matrix). It is of little importance in this connection how many information streams enter into the heterodyning chip; what is important, however, is the manner in which these two information streams are combined.

In a receiver, the same parameters param by means of which this information stream has been previously encoded as shown in FIG. 1a, are then used for decoding. For this purpose, information is supplied to an information separating chip Decod, shown in FIG. 1b, where the basic matrix generated in the encoding step in FIG. 1a is also generated in the decoding step shown in FIG. 1b. By comparing the information stream info with the basic matrix which was generated with the aid of the parameters param, the cells which were changed for encoding the information are immediately obtained. Since the receiver now knows the way in which the matrix cells have been successively occupied for encoding the information, it can recover the figure codes of the data units if it reverses this sequence and can thus chain together data unit with data unit in order to obtain the sequence of data units which was encoded at the beginning by the sender.

In an exemplary embodiment, a two-dimensional matrix can be simply counted through row by row and cell by cell during the encoding. The first value of a text (the sequence to be encoded) would be entered into the matrix cell whose position corresponds to the first value of a text's numerical or ASCII value. This matrix cell originally contains, for example, the value which was allocated to it by the chaos function and, after encoding, is changed accordingly so that the receiver can detect that a change has been carried out in this cell. During the decoding, the receiver can then conclude, from the position of the cell in the matrix, which ASCII character was allocated to this cell. The next ASCII character to be encoded in the information sequence is then, for example, beginning with the current position of the encoding cell, entered in the cell whose position is obtained from the fact that the ASCII value of the subsequent character is added to the present position of the encoding cell. If, in the course of this process, the end of the row of the two-dimensional matrix is reached, counting is simply continued in the next subsequent row. The method for coding and decoding described here represents a very simple variant. It is quite easily conceivable that multidimensional matrices are used and that counting is not simply continued from one row to the next but that branching can occur virtually spatially, i.e., multidimensionally. It is only of importance that the transmitter and the receiver know the order in which to proceed. To further compound the encoding process, for example, the value of a matrix cell which is to contain the encoding information can be changed not by a constant amount but by an amount which is determined via a function, for example, an encoding chaos function.

The receiver, following the inverse application of the method according to the invention, obtains from the information separating chip information item 1 or 2, or a mixture thereof, depending on the agreement between the transmitter and receiver. Information item 1 can be present in any form, for example, text, images, audio, or video. This information is is then fed into the information heterodyning chip Cod, for example, together with an information item 2 and the parameter of a feedback function. In this chip, the information items are heterodyned (or combined) in some manner so that the result is an information set info in which information items 1 and 2 are present in uniform indistinguishable form, unless it is used in the information separating chip Decod.

Figure 2:
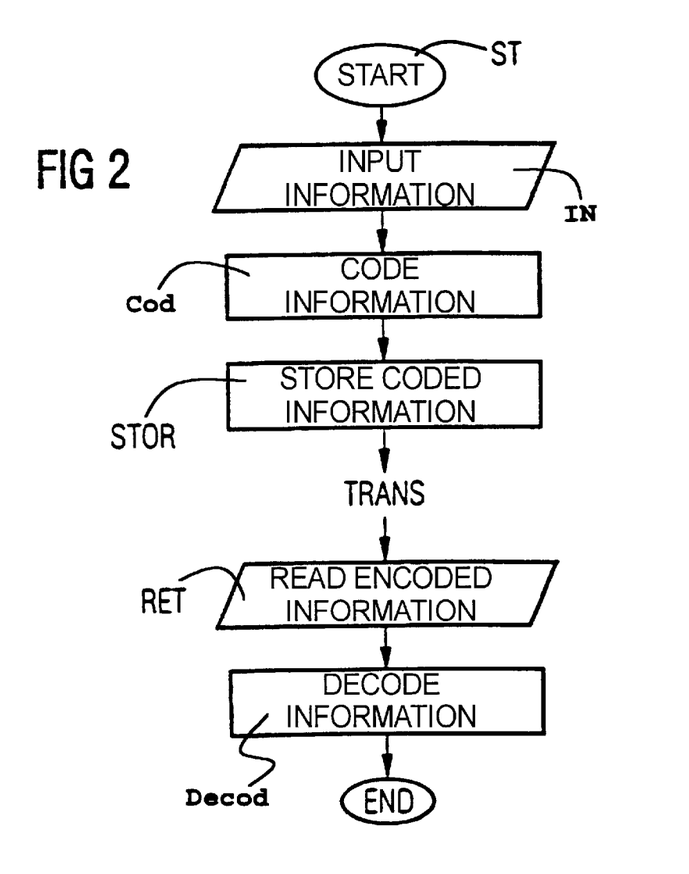
FIG. 2 is a flowchart showing the path of the data during the encoding and during the decoding.

FIG. 2 provides an example of encoding and decoding of the method according to the invention. The method starts at ST. The information is input IN in the form of figure-coded data units. The information is then coded in accordance with the information heterodyning chip Cod as has been explained in the description of FIG. 1A. The encoded information is then stored in a module STOR so that it can subsequently be transmitted. This encoded information corresponds to the information set info from FIGS. 1A and 1B. This step is followed by the transfer TRANS of the encoded information to the receiver. The receiver first reads the encoded information into a module RET. The encoded information is then supplied to an information separating chip Decod where the transmitted encoded information is decoded. As has been explained in FIG. 1B, the receiver subsequently receives decoded data (i.e., the information sequence of data units which were transmitted at the transmitter). The method ends at END.

Heterodyning and separating functions can be suitable mathematical functions with a complex range of definitions and values (that is to say, functions on complex numbers). In connection with the claims, this application also discusses feedback functions in which the same function is iteratively applied several times to its own function values. Functions which have a chaotic behavior are especially suitable. When a two-dimensional matrix is used using gray-scale value coded images, those functions which supply asymmetric images are especially suitable.

The latter ensure that the heterodyned information set cannot be reconstructed into its components by means of the usual brute-force search strategies without knowledge of the parameters, even though the number of parameters is small. The information heterodyning chip Cod and the information separating chip Decod (and their components in all variants) can be entirely combined and implemented both as hardware chips (e.g. as ASIC), as parts of a hardware chip, (for example in a smart-card chip) or as a pure software module.

In a variant of the embodiment of the invention, one may intend to conceal, for example, a text in an image. This text consists of figure-coded data units, these data units possibly being letters which are coded by means of the ASCII code. In this method, the ASCII code forms would be represented by information item 1 from FIGS. 1A and 1B. The matrix is selected to be two-dimensional, for example, and an image is generated with the aid of a chaotic function, which is generated as pixel graphics, e.g. with a pixel word length of 256 bit per pixel from the predetermined parameters. Examples of the generation of such images from chaotic information are given in the book by Peitgen/Richter: The Beauty of Fractals, pages 189–193. The algorithm of the information combining chip Cod occupies the pixels of the image generated (a pixel matrix) with the values of the chaos function in a suitable order. For example, in the flowchart of FIG. 3, the information combining chip counts the pixels entered (step z=z+1). If this counter reaches the integer value of the next ASCII character to be coded (step z=text [b]), the current pixel value is, for example, incremented or decremented by 1 (step pixel[i,j]=pixel[i,j]+1) and the counter which counts the pixels is set to zero.

Without knowledge of the parameters of the chaos function and of the combining chip, the encoded values will never show, and it can never be found out systematically which of the chaotically distributed pixels have one gray step too many compared with their preceding pixel. This means that it is exceedingly difficult to find out which pixel values, i.e., gray-scale values or color values, have been changed without knowledge of the function parameters and of the basic matrix.

In this ASCII coding example, when the parameters of the chaos function and of the combining algorithm in the combining chip are known, the receiver of the heterodyned information can then separate the ASCII text out of the image with the aid of the separating chip Decod. This means that every time a skipped word value, i.e., gray-scale value or color value, is found, the receiver knows that this is associated with a coding of an ASCII character. For example, its integer value corresponds exactly to the number of pixels occupied by the algorithm which are located between the last coded character (or the first occupied pixel) and this pixel.

In the procedure according to the invention, it is of particular importance to take into consideration that it is not mandatory to skip exactly one word of a pixel. It could just as well be another fixed number (e.g. three gray-scale or color scale values may be left out in each case), or even a sequence determined by a function; such a function could include skipping one word value at the first ASCII character, two word values at the second one and so on. The execution of the method according to the invention becomes even more difficult and more complex if this function itself represents a chaos function (which is distinct from the chaos function used to occupy the basic matrix originally). The omission value is then determined, for example, by the skip function U and a starting value around zero in the information combining chip. For example, in the variant of the method according to the invention presented here, the counter of the information chip Cod can also be selected differently. However, it must be ensured that each text can be coded in one or more images which are not too large. The counter meets this condition if the following holds true: establish a suitable number n. After in each case n-occupied pixels, each integer value of an ASCII character must have been a function value at least once. This is shown in more specific terms in FIG. 3 for the information heterodyning and in FIG. 4 for the information separation. Generally, an automatic compression of the chaos images is possible, for example, in order to lower the transmission costs.

A further variant of the method according to the invention utilizes an image that has only has gray-scale values of zero and one and is hidden in another image in order to conceal the fact that information is being transmitted with this image. For example, in a first step, a text is coded as described above in an image which has only the gray-scale values of zero and one. The information thus encoded is, in a second step, hidden, for example, in an image which may be pixel graphics with a pixel word length of 1024 bits. By simply heterodyning/combining the two images in an information heterodyning chip in a manner described herein or known in the art, the coded image is now woven into the image having the high gray-scale or color-value grading at one or more places like a watermark. Due to the small delta (change of a pixel by only one bit), only two gray-scale values 0 and 1, by means of which the information was coded in the original image, the image having the large information word length is not influenced on a perceptible scale. For example, the two images are simply added or subtracted for this purpose in the information heterodyning chip. This means that wherever image 2 had a pixel value of 1, the information word length in image 1 is decreased by 1 or increased by 1. This change cannot be seen in the heterodyned image and the positions cannot be systematically found out without knowledge of the parameters of the chaos function and of the heterodyning chip. If then this knowledge of the parameters of the chaos function and of the heterodyning chip exists, a test chip can be implemented which tests whether an image contains the watermark. This could be preferably used, for example, for checking copyrights when there is a suspicion that somebody is using images or other multimedia information without authorization. The watermark is then the proof of the origin of the image as in the case of banknotes (possibly by using a governmental printer in the case of genuine banknotes). Other possibilities could include weaving company logos, etc., in as watermarks. To prevent unauthorized users from copying their own watermarks into protected data, copyrights, for example, are monitored. For example, an application is conceivable that uses databases in which copyrights are collected. This database could contain, for example, the parameters of the watermark, the date of acceptance into the database and a section from the protected data, and could exist in certain authorities/institutes. If several watermarks of one data source are found later, the copyrights can be checked. Such databases can also be set up on the Internet, in which, for example, authors can store their copyrights. However, older data in these databases would only be changed with authorization.

As in the case of the description of the first application variant, it is possible to use any functions in the information heterodyning chip, not only the subtraction chosen as the example above. For example, the pixel could be alternately subtracted or added or each fifth pixel could be added and all others subtracted and so forth. It is also not mandatory that the watermark image only have a pixel word length of 1 bit. Any number could be used, but it should not be so large that the difference in the environment becomes visible in the overall image.

Other embodiments of the information separation chip are also conceivable. For example, messages or message streams, multimedia data lengths (images, videos, music CD contents, software programs, games etc.), surrogates of value systems (e.g. electronic money, electronic stamps) etc. can be used for the encoding.

The information separation chip can be used, for example, as an information filter. When the information separation chip is embodied as an information filter, it can be ensured that certain messages or information items can only be read by authorized people or user programs. This makes it possible to provide better protection for the privacy of the individual person. A suitable information separating chip is especially the first variant in which, for example, an information separating chip can be supplied with various messages or digital data streams for authentication and it can be used for checking whether a particular watermark is present at particular cells of the transmitted information, and if so, the information can be forwarded to the receiver and if not, any further processing of the information can be inhibited. Furthermore, for example, hierarchic access filters can also be implemented in which different watermarks or fetched information serve as identification for separating the different hierarchies. Further examples of the application, in which authentication is possible with the aid of a watermark which is woven into the data streams, are specified below:

- Systems for receiving chargeable TV and video or audio contents
- Computer games
- Presentation documents
- Electronically available books, newspapers, reference works, search systems
- Access systems, for example for cars, house doors, building locking systems.

In the access systems application, person-related information (code card PINs and the like) can be heterodyned with object-related information (key numbers, engine block numbers) and checked when access is attempted. Among other things, such numbers could also be used, for example, as parameters or parameter parts of the complex function in the information heterodyning chip.

Figure 3:
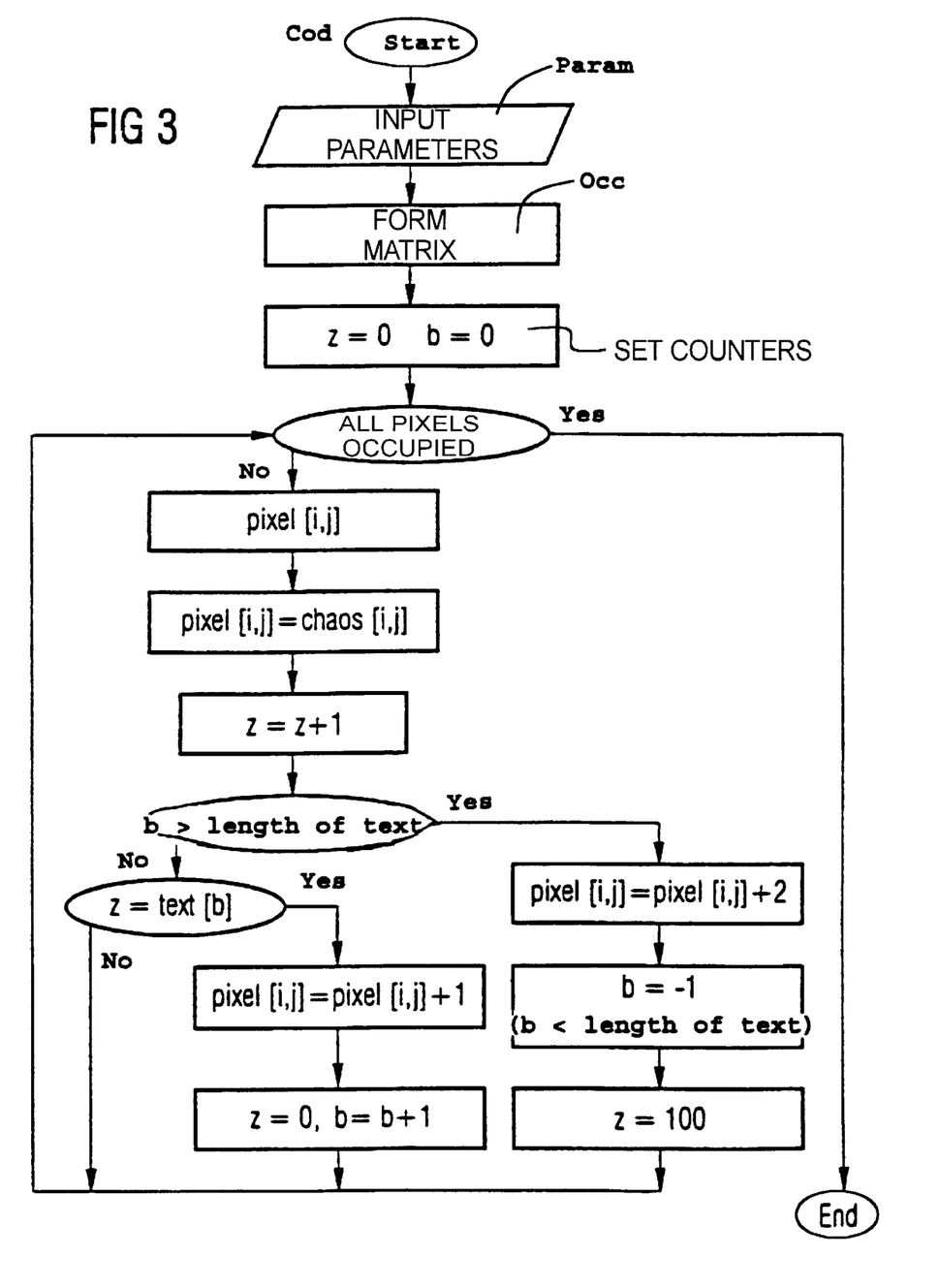
FIG. 3 is a flowchart showing an illustrative example of the method according to the invention for encoding data.

FIG. 3 shows the simple encoding of figure-coded data units according to the method of the invention. The encoding begins at START. In the param module, the parameters forming the basis of the encoding arc input by the user. In the Occ module, the basic matrix is occupied, for example, by the values generated from the occupying chaos function. Following that, for example, the pixel counter z (for the basic matrix) and the ASCII counter b (for the figure-coded data units of the encoding sequence) are set to zero if a two-dimensional matrix is used. Then the individual pixels of the chaos image (cells of the basic matrix) are processed. The first interrogation is whether all pixels have already been occupied with encoded values. Here, this is only described for the two-dimensional case. However, multidimensional applications are also conceivable which can be executed in an analogous manner by an expert in the field. During the further procedure of the method, a check is also made as to whether the entire text has already been entered and encoded. If not, the procedure continues until the complete text has been processed. After that, the encoded text which is the basic matrix that has been processed with encoded values, is output at END.

Figure 4:
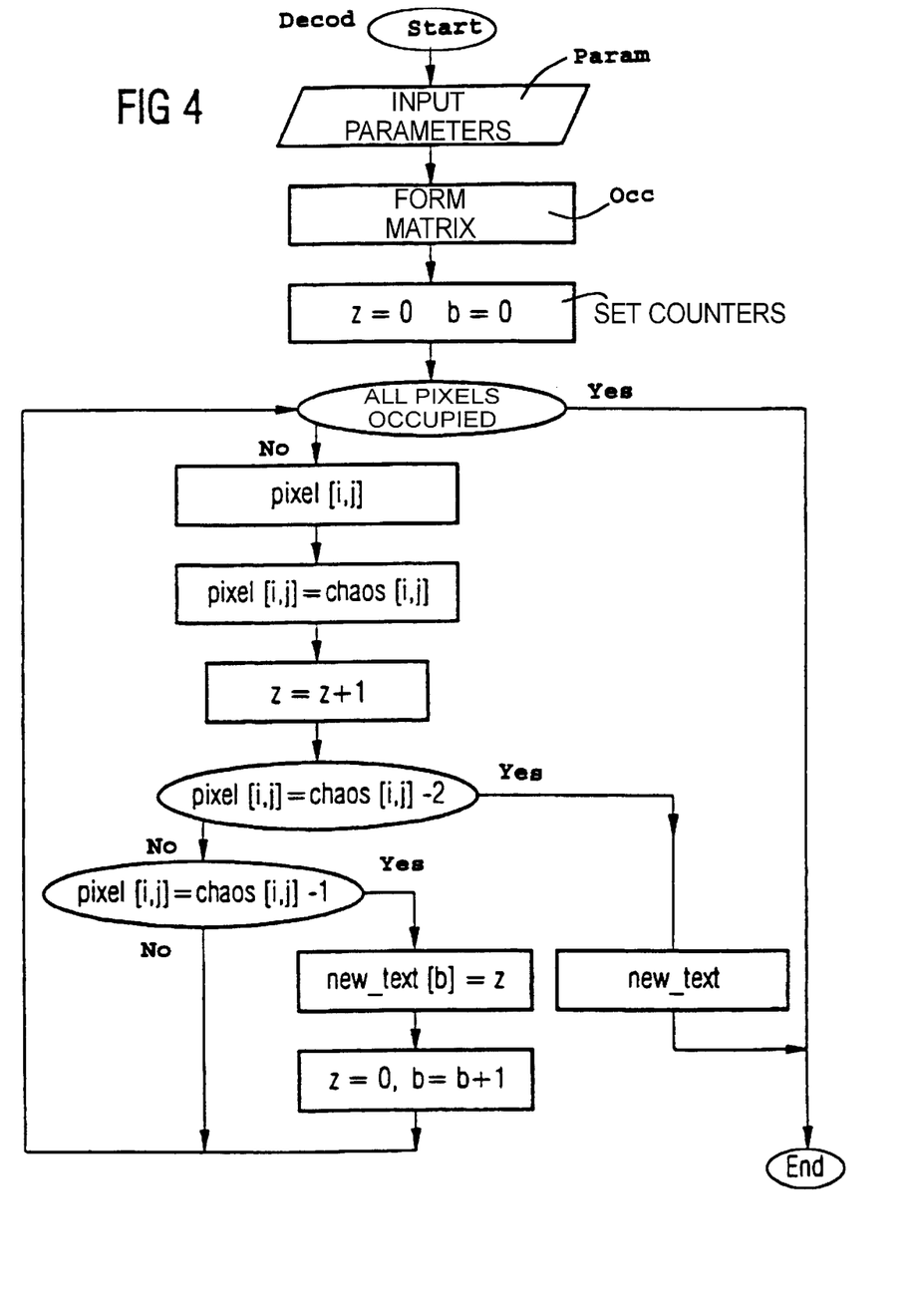
FIG. 4 is a flowchart showing an example of a method according to the invention for decoding data.

FIG. 4 gives an example of the information separating process according to the method according to the invention. Modules with the same designations also carry out the same actions which have been explained in FIG. 3. For the rest, the reverse procedure to that in FIG. 3 is carried out in order to obtain the code number of the encoded letters, i.e., the ASCII numbers.

Figure 5:
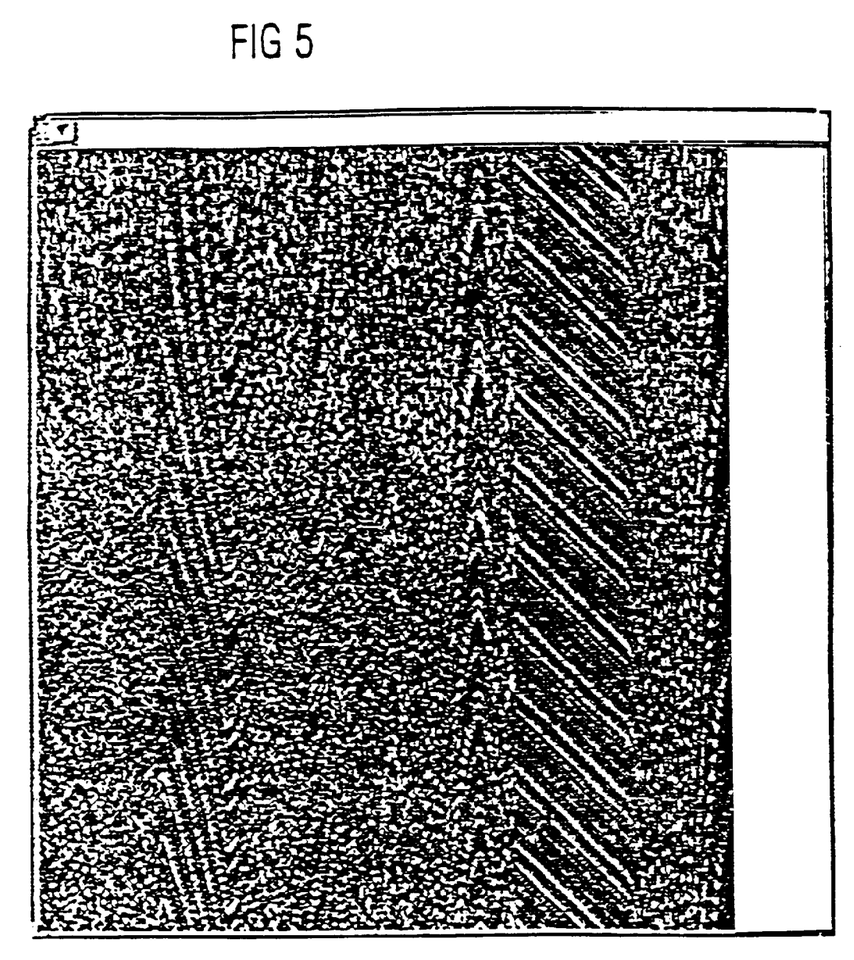
FIG. 5 is a matrix image according to the invention as gray-scale image without encoded information.

FIG. 5 shows an image which was generated with the aid of a chaos function and which does not contain any information coded in accordance with the method of the invention.

Figure 6:
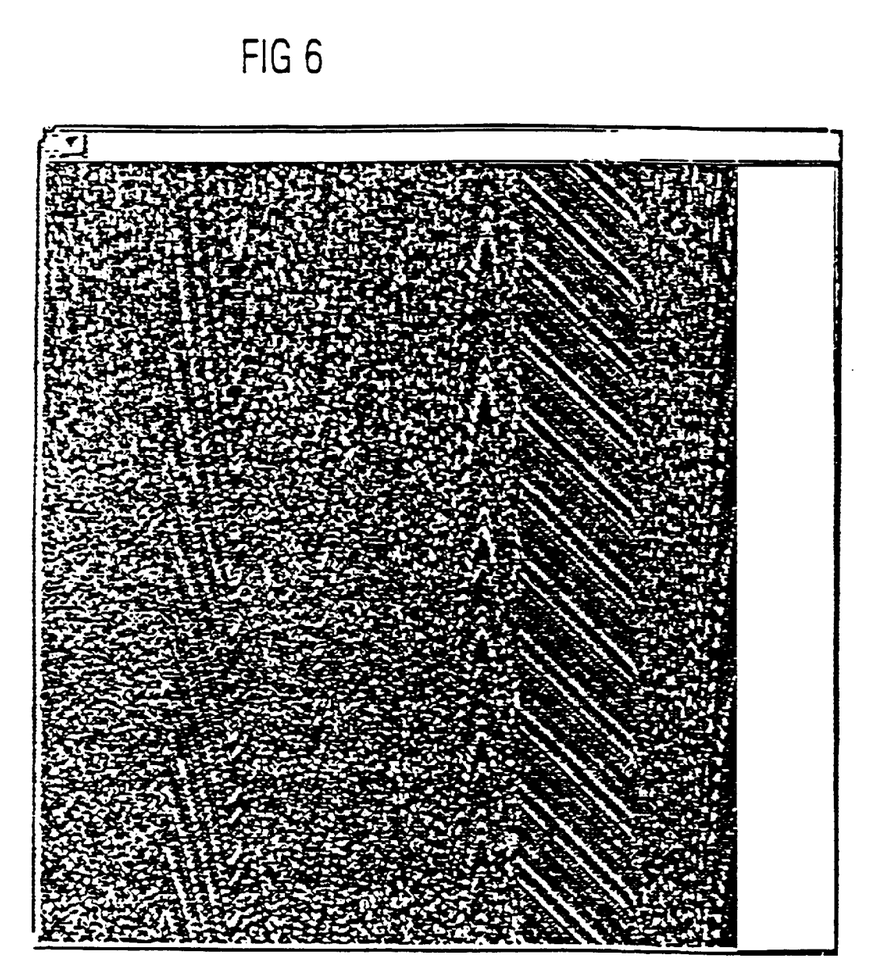
FIG. 6 is a matrix image according to the invention which contains information encoded in the form of gray-scale values.

FIG. 6 shows the same image as in FIG. 5, which only differs in the fact that a text was coded into this image in accordance with the method of the invention. These two images appear to be identical to the superficial observer. Without knowledge of the function parameters of the chaos function and the corresponding values with which the individual matrix cells, in this case the gray-scale values of the respective pixels, were changed, an unauthorized person is not able to decode the information contained in this image.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for encoding sequences of figure-coded data units which are numerical data to be encoded and producing an encoded numerical data sequence comprising:

generating said sequence of numerical data to be encoded as a numerical data set and providing said sequence of numerical data to an input of an information processing unit;

filling cells contained within a multi-dimensional matrix with values by said information processing unit, wherein said values are calculated by applying a first feedback function to a cell index which specifies a position of a cell within said matrix, and wherein said first feedback function is implemented within said information processing unit;

encoding a first number from said sequence of numerical data to be encoded by changing a first value of a cell of said matrix by a first encoding value, and calculating a first position of said cell containing said first value by applying a first reversible function to said first number from said sequence;

encoding a second number from said sequence by changing a second value of a cell of said matrix by a second encoding value determined as a function of a numerical count of previously encoded numbers from said sequence, and calculating a second position of said cell containing said second value by applying a second reversible function to both said first number and said second number; and producing said encoded numerical data sequence by outputting said matrix representing said encoded numerical data sequence, which is a post-encoding operation matrix, from an output of said information processing unit.

2. The method according to claim 1, wherein:

said step of encoding a first number further comprises:
combining, after starting from a starting cell of said matrix, cell indices of said starting cell with said first number from said sequence in an unambiguous and reversible manner, producing cell indices of a first encoding cell; and wherein said step of encoding a second number further comprises:
changing said second value of a cell of said matrix whose cell indices are determined by combining said cell indices of said first encoding cell with said second number from said sequence in said unambiguous and reversible manner.

3. The method according to claim 1, wherein:

said first feedback function is a chaos function; and said method further comprising the step of:

using a first function value supplied by said chaos function for filling said matrix with values, wherein said first function value is supplied by said chaos function after repeated iterations, depending on a variation of said chaos function after exceeding a predetermined limit value.

4. The method according to claim 3, further comprising the step of:

using a first function value supplied by said chaos function for filling said matrix with values, wherein said first function value is supplied by said chaos function after a predefined number of repeated iterations where said predetermined limit value cannot be met.

5. The method according to claim 2, wherein said step of producing cell indices of said first encoding cell further comprises the step of adding said first number to at least one of said matrix indices.

6. The method according to claim 1, wherein said encoding value is the number 1.

7. The method according to claim 1, further comprising the step of determining said encoding value by a chaos function.

8. The method according to claim 1, further comprising the step of:

combining, said post-encoding operation matrix with data on an image medium using an element-wise operation for a purpose selected from the group consisting of authentication or identification.

9. The method according to claim 1, further comprising the step of:

combining, using an element-wise operation, said post-encoding operation matrix with an image data record for a purpose selected from the group consisting of authentication or identification.

10. A method for encoding sequences of figure-coded data units which are numerical data to be encoded and producing an encoded numerical data sequence comprising:

generating said sequence of numerical data to be encoded as a numerical data set and providing said sequence of numerical data to an input of an information processing unit;

filling cells contained within a multi-dimensional matrix with values by said information processing unit, wherein said values represent color or gray-scale values of an image;

encoding a first number from said sequence of numerical data to be encoded by changing a first value of a cell of said matrix by a first encoding value, and calculating a position of said cell containing said first value by applying a first reversible function to said first number from said sequence;

encoding a second number from said sequence by changing a second value of a cell of said matrix by a second encoding value determined as a function of a numerical count of previously encoded numbers from said sequence, and calculating a position of said cell containing said second value by applying a second reversible function to both said first number and said second number; and producing said encoded numerical data sequence by outputting said matrix representing said encoded numerical data sequence, which is a post-encoding operation matrix, from an output of said information processing unit.

11. The method according to claim 10, wherein said encoding value is scaled such that a changed value of a cell can represent the number of possible color or gray-scale values.

12. A method for encoding and decoding sequences of figure-coded data units which are numerical data and producing an encoded numerical data sequence comprising:

generating said sequence of numerical data to be encoded as a numerical data set and providing said sequence of numerical data to an input of an information processing unit;

filling cells contained within a multi-dimensional matrix with values by said information processing unit, wherein said values are calculated by applying a first feedback function to a cell index which specifies a position of a cell within said matrix, and wherein said first feedback function is implemented within said information processing unit;

encoding a first number from said sequence of numerical data to be encoded by changing a first value of a cell of said matrix by a first encoding value, and calculating a first position of said cell containing said first value by applying a first reversible function to said first number from said sequence;

encoding a second number from said sequence by changing a second value of a cell of said matrix by a second encoding value determined as a function of a numerical count of previously encoded numbers from said sequence, and calculating a second position of said cell containing said second value by applying a second reversible function to both said first number and said second number;

producing said encoded numerical data sequence by outputting said matrix representing said encoded numerical data sequence, which is a post-encoding operation matrix, from an output of said information processing unit;

filling cells, by a receiver, contained within a multi-dimensional output matrix with values by an information separating processing unit for decoding said encoded numerical data, wherein said values are calculated by applying a function related to said first feedback function and its application to said multi-dimensional matrix;

comparing said encoded numerical data value by value with said output matrix, producing identified changed values;

applying a first inverse reversible function related to said first reversible function to said first calculated position for decoding a first changed value of said identified changed values, thereby finding said first number of said sequence;

applying a second inverse reversible function related to said second reversible function to a second changed value of said identified changed values, thereby finding said second number of said sequence in a reverse order from said encoding of said sequence, producing a decoded sequence; and outputting from an output of said information separating processing unit said decoded sequence.

13. The method according to claim 1, wherein said first reversible function is identical to said second reversible function.

* * * * *